(12) United States Patent
Edrich

(10) Patent No.: US 7,194,660 B2
(45) Date of Patent: Mar. 20, 2007

(54) MULTI-PROCESSING IN A BIOS ENVIRONMENT

(75) Inventor: David S. Edrich, Austin, TX (US)

(73) Assignee: Newisys, Inc., Austin, TX (US)

( * ) Notice: Subject to any disclaimer, the term of this patent is extended or adjusted under 35 U.S.C. 154(b) by 537 days.

(21) Appl. No.: 10/602,396

(22) Filed: Jun. 23, 2003

(65) Prior Publication Data

US 2004/0260917 A1   Dec. 23, 2004

(51) Int. Cl.
*G06F 11/00* (2006.01)

(52) U.S. Cl. .......................... 714/36; 714/30; 714/42; 714/718; 713/1; 713/2; 711/150; 711/153

(58) Field of Classification Search .................. 714/30, 714/36, 42, 718; 713/1, 2; 711/150, 153
See application file for complete search history.

(56) References Cited

U.S. PATENT DOCUMENTS

| | | | |
|---|---|---|---|
| 5,357,621 A * | 10/1994 | Cox | 711/172 |
| 5,673,388 A * | 9/1997 | Murthi et al. | 714/42 |
| 5,724,527 A * | 3/1998 | Karnik et al. | 710/315 |
| 5,938,765 A * | 8/1999 | Dove et al. | 713/1 |
| 6,167,492 A | 12/2000 | Keller et al. | 711/154 |
| 6,385,705 B1 | 5/2002 | Keller et al. | 711/154 |
| 6,421,775 B1 * | 7/2002 | Brock et al. | 713/1 |
| 6,490,661 B1 | 12/2002 | Keller et al. | 711/150 |
| 7,065,688 B1 * | 6/2006 | Moyes et al. | 714/718 |

OTHER PUBLICATIONS

*HyperTransport™ I/O Link Specification Revision 1.03*, HyperTransport™ Consortium, Oct. 10, 2001, Copyright © 2001 HyperTransport Technology Consortium.

* cited by examiner

*Primary Examiner*—Robert Beausoliel
*Assistant Examiner*—Charles Ehne
(74) *Attorney, Agent, or Firm*—Beyer Weaver, LLP

(57) ABSTRACT

A basic input/output system (BIOS) for use in a computer system having a plurality of processors is described. The BIOS is embodied in a computer readable medium as computer program instructions which are operable to facilitate substantially simultaneous operation of the plurality of processors. According to one embodiment, the processors are simultaneously enabled to test of different portions of the system memory.

6 Claims, 4 Drawing Sheets

MULTI-PROCESSING IN A BIOS ENVIRONMENT

BACKGROUND OF THE INVENTION

The present invention relates to operation of a basic input/output system (BIOS) in a computer environment. More specifically, specific embodiments of the invention enable multi-processing in a BIOS environment.

Most computers, and particularly those based on the conventional PC architecture, employ a BIOS stored in non-volatile memory to load the operating system at boot up, perform a power-on self test, and provide a set of low-level routines that the operating system uses to interface to different hardware devices. For example, as part of the self test, a processor executing the BIOS code typically performs an initialization and test of the system RAM by writing and reading data patterns to and from the system RAM.

Even in multi-processor systems, conventional BIOS code is single-threaded, i.e., only one processor (typically referred to as the boot strap processor or the BSP) operates at any given time. The BSP executes most of the boot code in the BIOS with only brief periods where code may be executed by another secondary processor. During these times, the boot or primary processor remains in a wait state until the secondary processor finishes execution of its code.

The single-threaded nature of conventional BIOS code has increasingly become a bottleneck at boot up as the amount of system memory to be tested has grown. That is, the time required for a single boot processor to fully test system RAM (which might be on the order of tens or hundreds of gigabytes) is becoming undesirably long. One solution could be to test only portions of the system memory. Another is to test the system memory less thoroughly. However, incomplete testing of system RAM is undesirable for obvious reasons.

In addition to the length of time required to fully test system memory, there are often hardware components in multi-processor systems between the boot processor and portions of the memory being tested, the failure of which is likely to be inaccurately reported as a memory failure. Obviously, accurate identification of system failures is highly desirable. And given that these intervening hardware components typically have their own tests, it is also desirable to avoid the redundant albeit indirect testing of these components during memory initialization.

It is therefore desirable to provide techniques for initializing and validating system memory in computer systems which address at least some of the foregoing issues. More generally, it is desirable to provide techniques which ameliorate limitations associated with the single-threaded nature of BIOS code.

SUMMARY OF THE INVENTION

According to the present invention, at least one multi-processor (MP) kernel is provided in the basic input/output system (BIOS) of a multi-processor computer system which enables the simultaneous execution of code on multiple processors. According to one specific embodiment, such an MP kernel is provided to enable multiple processors to perform initialization and validation of system memory.

According to one embodiment, a basic input/output system (BIOS) is provided for use in a computer system having a plurality of processors. The BIOS is embodied in a computer readable medium as computer program instructions which are operable to facilitate substantially simultaneous operation of selected ones of the plurality of processors.

According to another embodiment, a basic input/output system (BIOS) is provided for use in a computer system having a plurality of processors and a system memory. The BIOS is embodied in a computer readable medium as computer program instructions which are operable to facilitate substantially simultaneous testing of different portions of the system memory by selected ones of the plurality of processors.

Computer systems including basic input/output systems implemented according to the invention are also provided.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known features may not have been described in detail to avoid unnecessarily obscuring the invention.

The present invention provides a multi-processing kernel which may be incorporated into a BIOS and which may perform a wide variety of functions. One exemplary embodiment relates to such a multi-processing kernel which is adapted to perform memory initialization and validation at system boot up.

An exemplary multi-processor computing system will now be described in which various embodiments of the present invention may be implemented. It should be noted at the outset that many of the details of the described system are irrelevant to the invention in its broadest sense. For example, the present invention may be practiced in any of a wide variety of multi-processor systems, and is not limited by the point-to-point architecture described below, i.e., the invention is equally applicable to other types of point-topoint architectures as well as traditional bus architectures. Therefore, nothing in the following system description should be construed as unduly limiting the scope of the present invention.

Figure 1A:
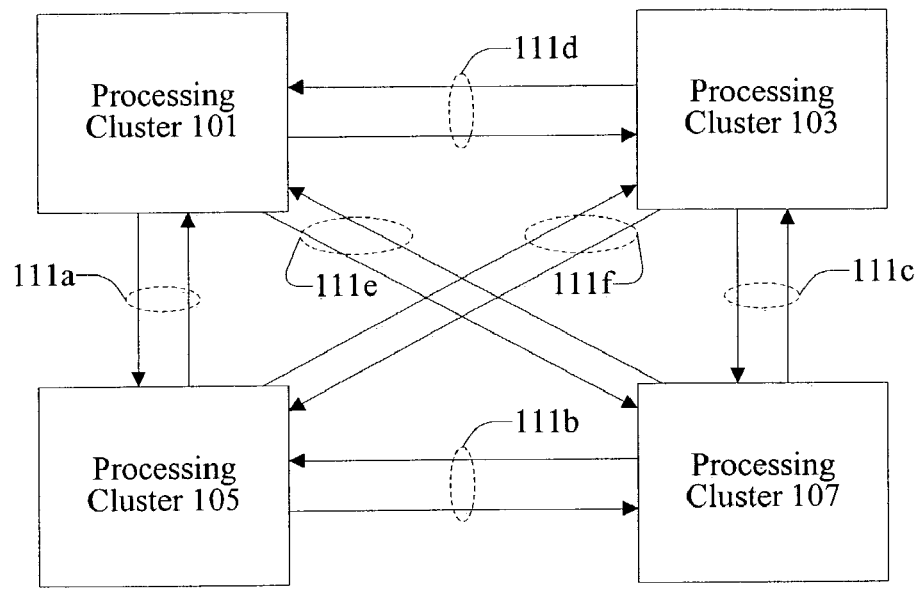
FIGS. 1A and 1B are block diagrams illustrating exemplary multi-processor systems having multiple clusters of processors in which embodiments of the invention may be implemented.

FIG. 1A is a diagrammatic representation of one example of a multiple cluster, multiple processor system which may employ the techniques of the present invention. Each processing cluster 101, 103, 105, and 107 includes a plurality of processors (not shown). The processing clusters 101, 103, 105, and 107 are connected to each other through point-to-point links 111a–f. The multiple processors in the multiple cluster architecture shown in FIG. 1A share a global memory space. In this example, the point-to-point links 111a–f are internal system connections that are used in place of a traditional front-side bus to connect the multiple processors in the multiple clusters 101, 103, 105, and 107. The point-to-point links may support any point-to-point coherence protocol.

Figure 1B:
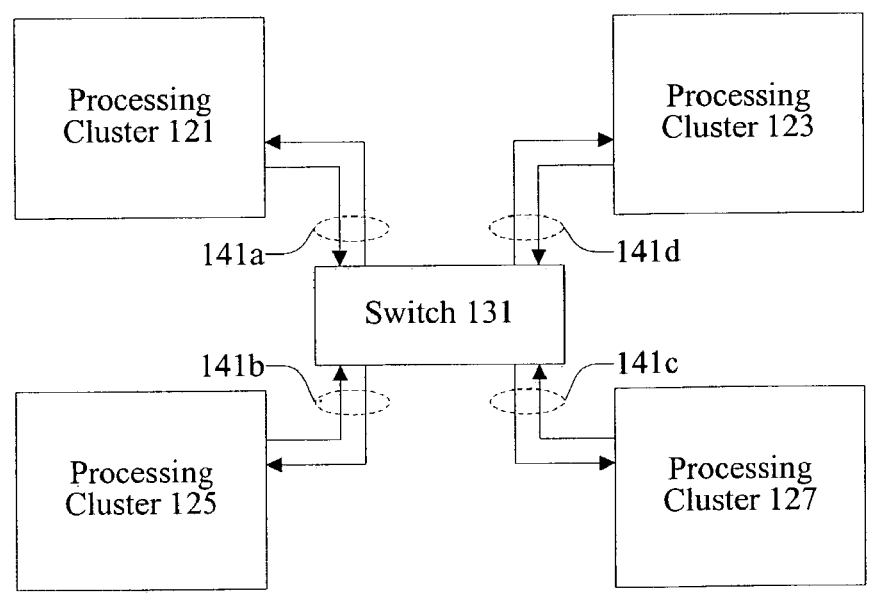

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a–d. It should be noted that using a switch and point-to-point links allows implementation with fewer point-to-point links when connecting multiple clusters in the system. A switch 131 can include a general purpose processor with a coherence protocol interface. According to various implementations, a multi-cluster system shown in FIG. 1A may be expanded using a switch 131 as shown in FIG. 1B.

Figure 2:
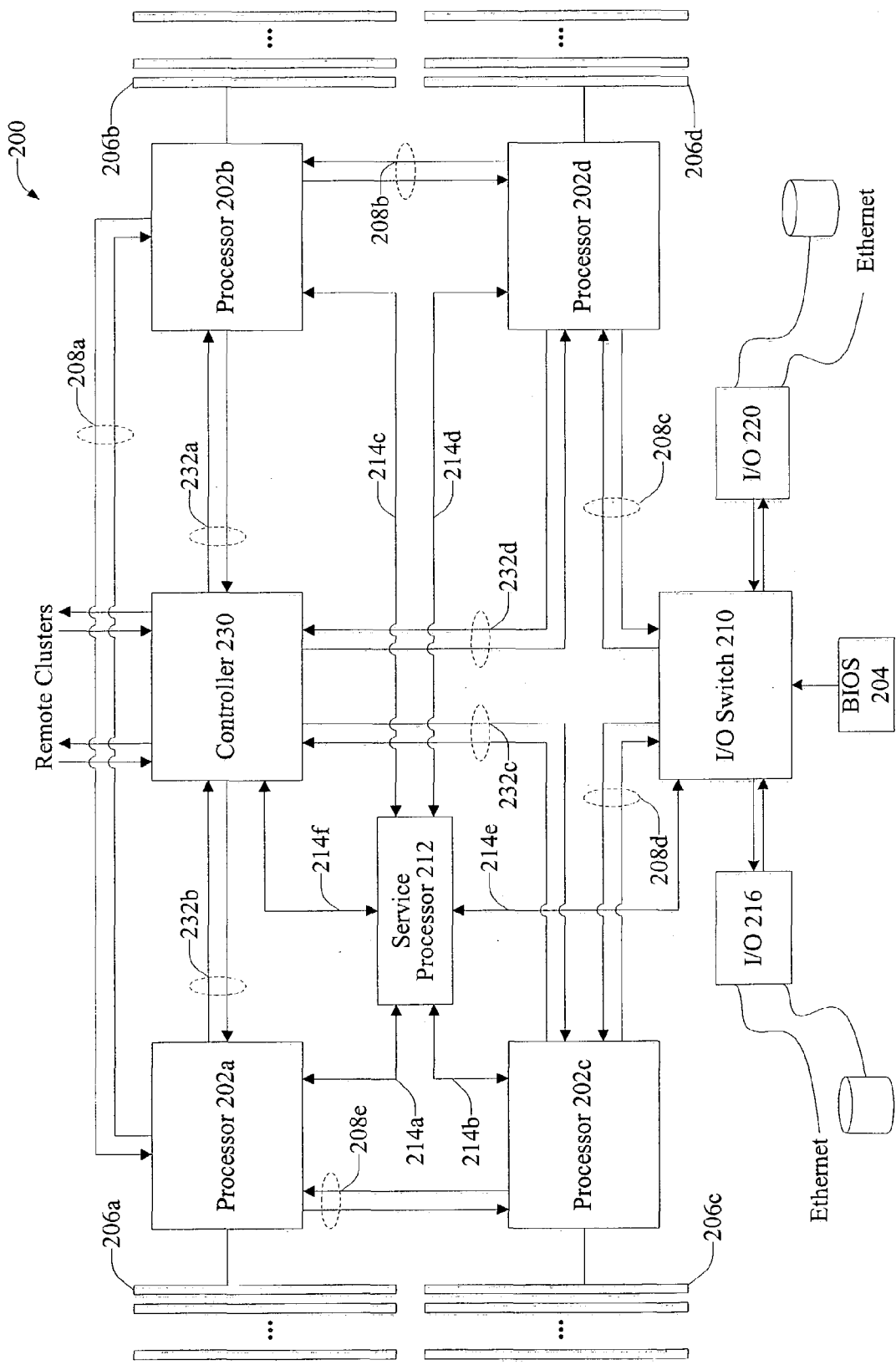
FIG. 2 is a block diagram of an exemplary cluster having a plurality of processors.

FIG. 2 is a diagrammatic representation of an exemplary multiple processor cluster such as, for example, cluster 101 shown in FIG. 1A. Cluster 200 includes processors 202a–202d, a basic I/O system (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and interconnection controller 230. The service processor 212 is configured to allow communications with processors 202a–202d, I/O switch 210, and interconnection controller 230 via a JTAG interface represented in FIG. 2 by links 214a–214f. It should be noted that other interfaces are supported. I/O switch 210 connects the rest of the system to I/O adapters 216 and 220, and to BIOS 204 for booting purposes. As will be described below, any of the processors in the system may be employed as the boot strap processor at boot up time.

According to a particular implementation, service processor 212 has the intelligence to partition system resources according to a previously specified partitioning schema. The partitioning can be achieved through direct manipulation of routing tables associated with the system processors by the service processor which is made possible by the point-to-point communication infrastructure. The routing tables can also be changed by execution of the BIOS code in one or more processors. The routing tables are used to control and isolate various system resources, the connections between which are defined therein.

The processors 202a–d are also coupled to an interconnection controller 230 through point-to-point links 232a–d. Interconnection controller 230 performs a variety of functions which enable the number of interconnected processors in the system to exceed the node ID space and mapping table limitations associated with each of a plurality of processor clusters. Other functions which may be performed by interconnection controller 230 include the maintaining of cache coherency across clusters. Interconnection controller 230 can be coupled to similar controllers associated with other multi-processor clusters. It should be noted that there can be more than one such interconnection controller in one cluster. Interconnection controller 230 communicates with both processors 202a–d as well as remote clusters using a point-to-point protocol.

The basic protocol upon which the clusters in the above-described system are based provides for a limited node ID space which allows for the unique identification of only a very limited number of nodes. To get around this limitation, a hierarchical mechanism is employed which preserves the single-layer identification scheme within particular clusters while enabling interconnection with and communication between other similarly situated clusters and processing nodes.

According to a particular implementation, one of the nodes in each multi-processor cluster is an interconnection controller, e.g., interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables are then employed to determine how to get from the requesting node to the node identified from the address mapping table. That is, as discussed above, each processor (i.e., cluster node) has associated routing tables which identify a particular link in the point-to-point infrastructure which may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc., each of which has a unit ID.

In addition, because individual transactions may be segmented in non-consecutive packets, each packet includes a unique transaction tag to identify the transaction with which the packet is associated with reference to the node which initiated the transaction. Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

The interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

Figure 3:
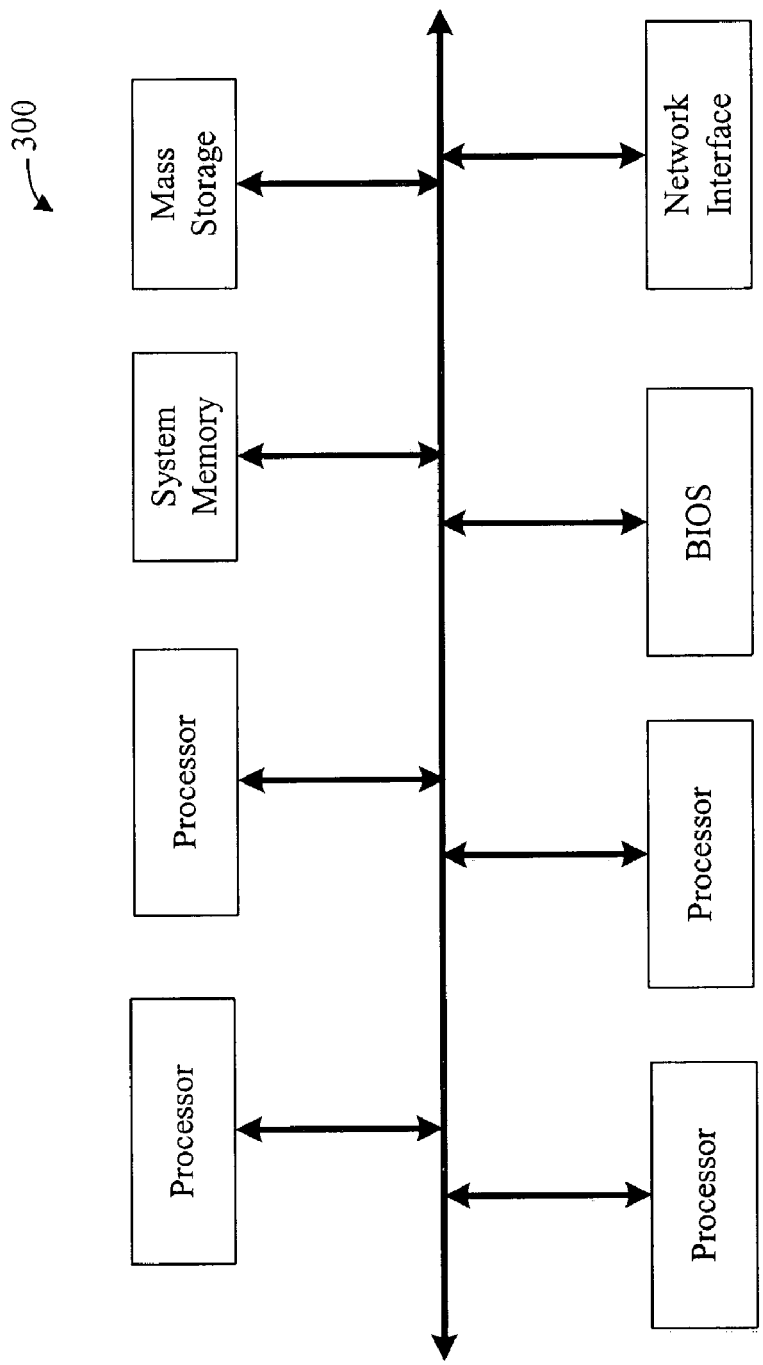
FIG. 3 is block diagram of an exemplary bus-based multi-processor computer system in which embodiments of the invention may be implemented.

A specific embodiment of a basic input/output system (BIOS) which includes a multi-processing kernel and which may be employed, for example, with the above-described multi-processor system will now be described. The specific multi-processing kernel described relates to memory initialization and validation at system boot up. As mentioned elsewhere herein, however, the scope of the present invention is not limited to this particular implementation or the aforementioned multi-processor system. That is, multi-processing kernels having other functions are within the scope of the invention. In addition, the present invention may be implemented in a system having a single cluster implemented like any of the clusters described above without the hierarchical mechanisms described. The present invention may also be implemented in a system employing a bus architecture rather than a point-to-point architecture. An example of such a bus-based system 300 is shown in FIG. 3.

Figure 4:
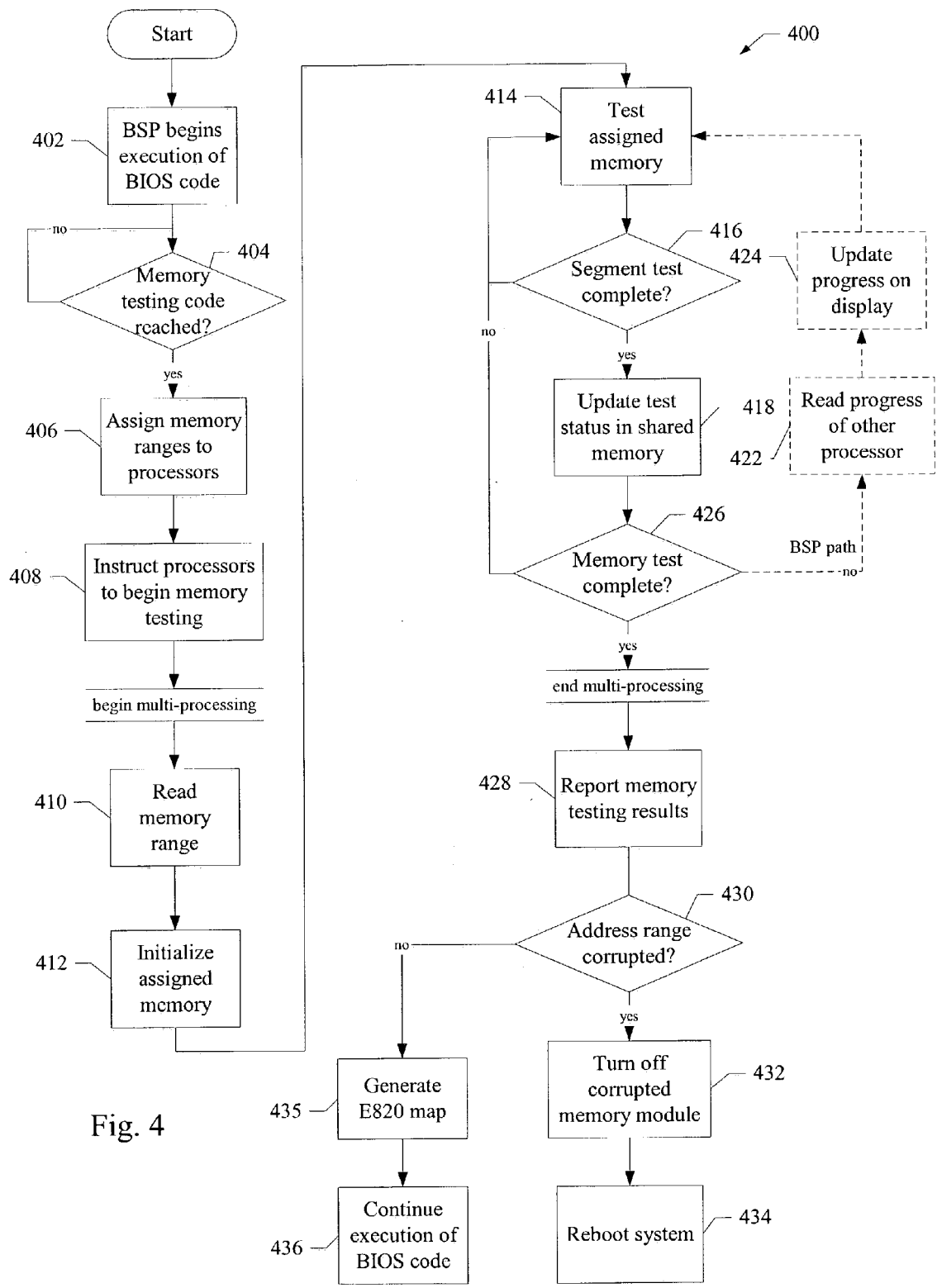
FIG. 4 is a flowchart illustrating operation of a multi-processing BIOS kernel according to a specific embodiment of the invention.

Referring now to the specific embodiment illustrated in flowchart 400 of FIG. 4, any of the processors in a multi-processor system employing the techniques of the present invention may operate as the boot strap processor (BSP), i.e., the processor which initiates and controls execution of the BIOS code. Upon power up, the BSP begins execution of the BIOS code (402). When the program pointer reaches the memory testing portion of the code (404), it divides up the system memory such that multiple processors are each assigned a memory range to test (406).

According to a particular implementation, each processor in the system is assigned the memory range mapped to the memory to which the processor is physically connected, i.e., the processor's "local" memory. The BSP writes the address range for each processor to a portion of its own local memory which has already been tested, i.e., "safe" memory, and which will be shared by all of the processors involved in memory testing as described below. The "safe" memory is relatively small portion, e.g., 4 MB, of the BSP's local memory previously tested using a writing and reading of data patterns in a manner similar to the way in which the remaining memory is to be tested.

According to various alternative embodiments, memory range assignment may be accomplished in a variety of ways. For example, in systems having multiple multi-processor clusters, one processor in each cluster could be assigned to test the entire memory range for that cluster, or even for a group of clusters. Alternatively, testing of the memory range for a cluster might be divided up among some subset of processor which is less than the total number of processors in the cluster.

Once the memory range assignments have been made, the BSP sends commands (e.g., an IPI startup sequence) to each processor to begin the memory testing (408). Each processor reads the memory range it has been assigned from the shared memory associated with the BSP (410), initializes its memory (e.g., sets the error correction code (ECC) state) (412), and begins testing its memory (414). According to various embodiments of the invention, this initialization and testing may be accomplished using any of a variety of conventional or proprietary algorithms. According to a specific embodiment, as each processor completes testing of an arbitrarily sized portion of its assigned memory range (416), e.g., 32 MB, the processor updates the amount of memory it has successfully tested in a corresponding field located in the shared memory associated with the boot strap processor (418).

According to various embodiments, an ordering mechanism, e.g., a lock prefix associated with instructions targeting the shared memory, may be employed so that no two processors are allowed to read or write the shared memory at the same time. Depending on the nature of the algorithm (s) being executed by the multi-processing kernel of the present invention, this precaution may or may not be necessary.

According to one embodiment, a processor may indicate completion of memory testing by writing to a separate completion field in safe memory. According to another embodiment, completion is inferred by the boot strap processor when a sufficient period of time has elapsed since the last update to each processor's field in safe memory. When all of the processors which have been assigned a memory range to test have completed testing of that memory (or have hung up somewhere during the testing process) (426), the boot strap processor reviews and reports on the results of the system memory initialization and validation process (428). According to various implementations, the reporting of the memory testing results may be accomplished in a variety of ways including, for example, (1) through setting CMOS nonvolatile storage to reflect the amount of system memory, (2) through recording the results for output via the BIOS E820 interface available to operating systems, and through which the complete memory map can be obtained indicating the address ranges where valid system memory exists and the uses for which the various ranges are employed, and (3) through the ACPI interface which can additionally illustrate the association of memory and memory modules to nearest processors.

According to a specific embodiment, the boot strap processor provides periodic progress reports on all the system memory being tested by the various processors. According to one embodiment, each time the boot strap processor (path denoted with dashed lines) completes the memory test algorithm for an arbitrarily sized segment of its own local memory (416), it reads the fields in the shared safe memory which indicate the progress being made by the other processors on their assigned memories (422). According to a more specific embodiment, the BSP updates the display based on this information (424).

When conventional memory tests encounter a corrupted memory address or range, a typical approach has been to simply truncate memory at that point. The results of the memory testing of the present invention may also be used in this manner. However, for obvious reasons (e.g., the potential loss of an entire cluster's memory), it is desirable to use alternative approaches which could salvage usable memory above the corrupted address(es). Therefore, according to a specific embodiment, the boot strap processor reviews and writes the results of the test for the E820 interface (indicating valid and invalid memory ranges). In another embodiment, the BSP reviews the test results (428), and, if an address or address range is identified as being corrupted in some way (430), the memory module corresponding to that range is turned off or otherwise made unavailable (432). The system is then rebooted with the remaining memory being remapped to be contiguous (434), thereby ignoring the unavailable memory. If no memory ranges are corrupted (430), an E820 map is generated (435), and execution of the BIOS code continues (436).

According to various embodiments, certain precautions may be taken to ensure that the memory testing threads being simultaneously executed by the multiple processors do not interfere with each other. For example, each processor may be assigned its own stack memory within the pre-tested safe memory associated with the BSP to avoid stack conflict. In addition, interrupts may be disabled for all of the processors involved in the MP kernel (other than the BSP) to avoid multiple processors interacting with the programmable interrupt controller at the same time.

Memory initialization and validation tests are typically viewed as a trade off between thoroughness and time. Because of the efficiency gains made possible by the parallel processing capabilities of the present invention, system designers may approach this trade off with greater flexibility than ever before. That is, for example, in embodiments in which each processor is assigned to test its own local memory, the designer may realize a reduction in memory testing time relative to the conventional single-threaded approach which is roughly proportional to the number of processors in the system. Alternatively, the designer could make the memory testing algorithms more rigorous (e.g., by writing and reading multiple test patterns instead of one), giving up some of the reduction in memory testing time in exchange for a more thorough test of the memory. Even in such a case, a substantial advantage relative to the single-threaded approach may be realized. As becomes apparent, the advantages of the present invention may keep pace with, i.e., scale with, the number of processors in the system. In any case, it will be understood that the present invention affords the designer considerable flexibility to strike the balance which is appropriate for a given application.

In addition to this increased flexibility, the embodiments of the present invention relating to memory initialization and testing can serve the purpose of isolating the initialization and testing of memory from at least some of the hardware components in the system which are required to communicate with that memory. That is, by allowing multiple processors to test their own local memories, the memory testing does not necessarily have to be performed by a remote processor through a path which may include a number of intervening hardware components.

While the invention has been particularly shown and described with reference to specific embodiments thereof, it will be understood by those skilled in the art that changes in the form and details of the disclosed embodiments may be made without departing from the spirit or scope of the invention. For example, a specific embodiment of the invention has been described with reference to the initialization and testing of memory during boot up. However, it will be understood that an MP kernel may be incorporated into a BIOS in a multi-processor system to facilitate execution of a variety of algorithms by multiple processors. For example, option ROM initialization may be facilitated by such an MP kernel if the option ROM code is written in a manner that allows it to execute in a multiprocessing environment. Alternatively, system cache may be initialized and tested using such an MP kernel. In general, any components which exist in multiple processor clusters may be initialized and/or tested using an MP kernel according to the present invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A basic input/output system (BIOS) for use in a computer system having a plurality of processors and a system memory, the BIOS being embodied in a computer readable medium as computer program instructions which are operable to facilitate substantially simultaneous testing of different portions of the system memory by selected ones of the plurality of processors, wherein one of the plurality of processors comprises a boot strap processor, and wherein the plurality of processors are configured in a plurality of multi-processor clusters, each of the clusters corresponding to at least one of the different portions of the system memory, wherein the computer program instructions are operable to cause the boot strap processor to assign only one of the processors in each cluster to the corresponding portion of the system memory.

2. A basic input/output system (BIOS) for use in a computer system having a plurality of processors and a system memory, the BIOS being embodied in a computer readable medium as computer program instructions which are operable to facilitate substantially simultaneous testing of different portions of the system memory by selected ones of the plurality of processors, wherein one of the plurality of processors comprises a boot strap processor, the computer program instructions being further operable to cause the boot strap processor to assign each of the different portions of the system memory to one of the selected processors, and to instruct the selected processors to begin testing of the system memory, the computer program instructions further being operable to cause each of the selected processors to initialize and validate its assigned portion of the system memory, to report memory testing progress to the boot strap processor, and to update the memory testing progress after testing a memory segment in its assigned portion of the system memory.

3. A basic input/output system (BIOS) for use in a computer system having a plurality of processors and a system memory, the BIOS being embodied in a computer readable medium as computer program instructions which are operable to facilitate substantially simultaneous testing of different portions of the system memory by selected ones of the plurality of processors, wherein one of the plurality of processors comprises a boot strap processor, the computer program instructions being further operable to cause the boot strap processor to assign each of the different portions of the system memory to one of the selected processors, to monitor progress in testing of the system memory by the selected processors, and to update status information corresponding to the progress after testing of a memory segment by each the selected processors in the assigned portion of the system memory.

4. A basic input/output system (BIOS) for use in a computer system having a plurality of processors and a system memory, the BIOS being embodied in a computer readable medium as computer program instructions which are operable to facilitate substantially simultaneous testing of different portions of the system memory by selected ones of the plurality of processors, wherein one of the plurality of processors comprises a boot strap processor, the computer program instructions being further operable to cause the boot strap processor to assign each of the different portions of the system memory to one of the selected processors, to generate memory testing results upon completion of the testing of the system memory by the selected processors, and to disable any memory modules corresponding to corrupted memory ranges indicated in the memory testing results, wherein the computer program instructions are further operable to cause the computer system to reboot after disabling the memory modules.

5. A basic input/output system (BIOS) for use in a computer system having a plurality of processors and a system memory, the BIOS being embodied in a computer readable medium as computer program instructions which are operable to facilitate substantially simultaneous testing of different portions of the system memory by selected ones of the plurality of processors, wherein one of the plurality of processors comprises a boot strap processor, the computer program instructions being further operable to cause the boot strap processor to assign each of the different portions of the system memory to one of the selected processors, and to disable interrupt generation by the selected processors.

6. A basic input/output system (BIOS) for use in a computer system having a plurality of processors and a system memory, the BIOS being embodied in a computer readable medium as computer program instructions which are operable to facilitate substantially simultaneous testing of different portions of the system memory by selected ones of the plurality of processors, wherein one of the plurality of processors comprises a boot strap processor, the computer program instructions being further operable to cause the boot strap processor to assign each of the different portions of the system memory to one of the selected processors, and wherein the computer program instructions are further operable to associate a lock prefix with instructions targeting a shared memory associated with the boot strap processor thereby ensuring that two of the processors do not access the shared memory at the same time.

* * * * *